July 19, 1949.  P. J. TOEWS  2,476,467
DOUGHNUT MACHINE
Filed Sept. 13, 1947  2 Sheets-Sheet 1

INVENTOR
PETER J. TOEWS
BY Caswell & Lagaard
ATTORNEYS

INVENTOR
PETER J. TOEWS

Patented July 19, 1949

2,476,467

UNITED STATES PATENT OFFICE 2,476,467

DOUGHNUT MACHINE

Peter J. Toews, Minneapolis, Minn., assignor to Dough-King, Inc., Minneapolis, Minn., a corporation of Minnesota Application September 13, 1947, Serial No. 773,769

8 Claims. (Cl. 99—406)

My invention relates to doughnut machines of the type having a kettle constructed with a channel forming a way in which the doughnuts are progressed along by the flow of the cooking liquid and in which the cooking liquid is discharged from the way through an outlet and into a reservoir through a screen and from which reservoir the cooking liquid is pumped back into the way through an inlet.

An object of the invention resides in providing a doughnut machine of such type in which the doughnuts are caused to travel along the way without crowding.

Another object of the invention resides in providing a doughnut machine of such type in which a predetermined height of the cooking liquid may be maintained in the way under all operating conditions of the machine.

A still further object of the invention resides in providing a doughnut machine having a chamber in which the elevation of the liquid corresponds to the height of the liquid in the way.

Another object of the invention resides in utilizing a portion of the reservoir of the doughnut machine as such chamber and in utilizing the elevation of the liquid in said chamber to control the height of the liquid in said way.

A still further object of the invention resides in providing a by-pass connecting said reservoir with said way intermediate the ends thereof, said by-pass conducting a portion of the cooking liquid into said reservoir past the screen.

A feature of the invention resides in constructing the way with a loop lying along said reservoir and in arranging said by-pass to conduct the liquid from said loop and to said reservoir.

An object of the invention resides in constructing the wall of said kettle between said loop and reservoir with an opening, and in providing a closure for said opening said closure having the by-pass formed therein.

Other objects of the invention reside in the novel combination and arrangement of parts and in the details of construction hereinafter illustrated and/or described.

Figure 1:
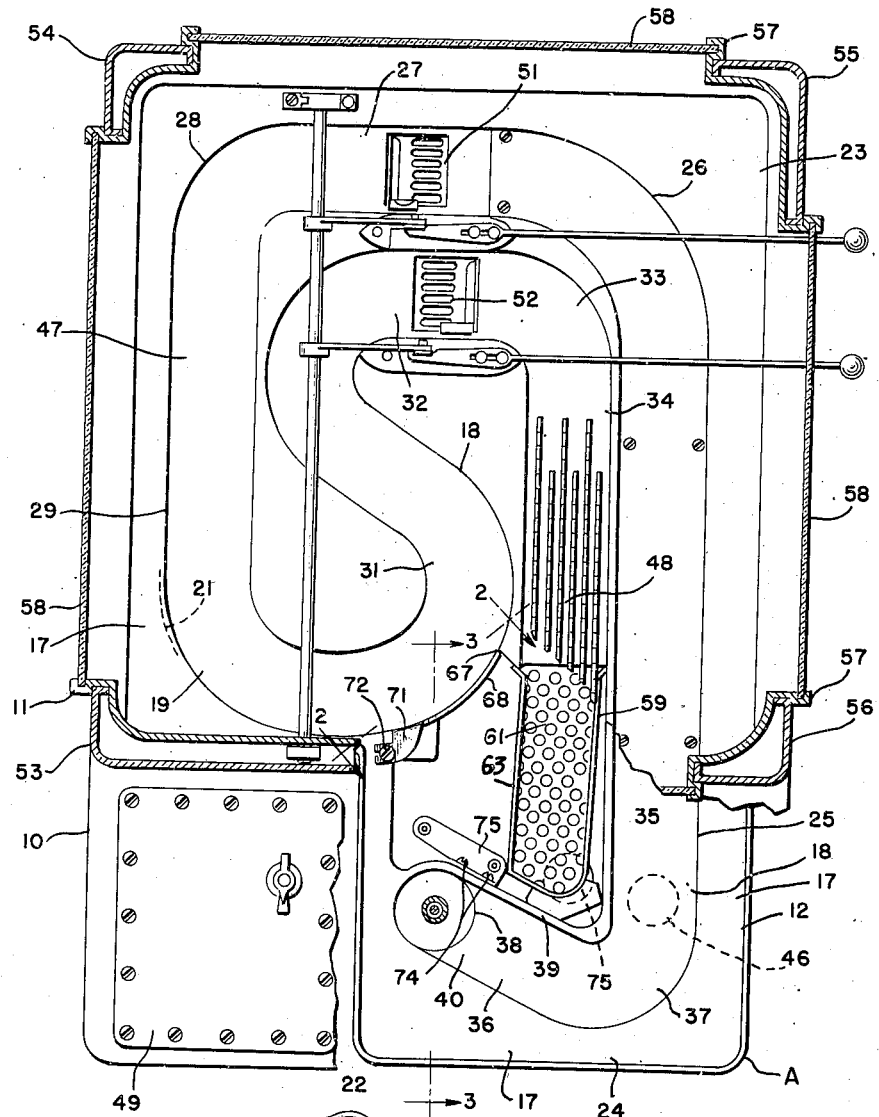
Fig. 1 is a plan sectional view of a doughnut machine illustrating an embodiment of my invention.

In the operation of doughnut machine in which the doughnuts are progressed along a way by means of the flow of the cooking liquid and where the cooking liquid is discharged from the way through a screen and into a reservoir, it frequently occurs that the screen becomes partly filled with crumbs and the discharge through the screen is reduced to an extent such that the height of the liquid in the way increases appreciably. Where a turner operated by the flow of the cooking liquid is used and where control devices for controlling the entry of the doughnuts to the turner and ejector are employed such devices often fail to operate properly when the height of the cooking liquid is above normal. A raising of the height of the cooking liquid in the way causes a lowering of the elevation of the cooking liquid in the reservoir. When the elevation of the cooking liquid in the reservoir is utilized to control the replacement of the cooking liquid consumed, such lowering of the elevation of the cooking liquid in the reservoir produces undesired introduction of additional cooking liquid in the kettle which further increases the height of the cooking liquid in the way and aggravates the faulty operation of the turner and control devices. The instant invention overcomes these difficulties by providing a by-pass whereby a certain portion of the liquid circulating through the way is returned to the reservoir independently of the screen to maintain the proper elevation of the liquid in the reservoir with reference to the height of the liquid in the way.

For the purpose of illustrating the application of my invention I have shown in the drawings a doughnut machine A which consists of a base 10 and a superstructure 11 resting on the same. Said doughnut machine further includes a cooking kettle 12 in which the raw doughnuts are placed and in which the same are cooked and progressed as the cooking occurs. These various parts will now be described in detail.

The base 10 may consist of any suitable framework on which the kettle 12 is supported and which may include angle frame members 13 attached to suitable legs not illustrated. Brackets 14 are secured to the frame members 13 and support the kettle through lugs 15 formed on the underside thereof. Bolts 16 extend through the brackets 14 and are screwed into the lugs 15.

The superstructure 11 includes a number of corner posts 53, 54, 55 and 56 which are provided with slots 57 in which panes of glass 58 are slidably mounted. These panes form side walls to the superstructure and allow the operator to view the operation of the doughnut machine. A top is also utilized with the superstructure 11 which is supported on the posts 53, 54, 55 and 56 and which has not been shown in the drawings.

The kettle 12 consists of a plate-like portion or top 17 which has a channel 18 in the same. This channel is elongated and circuitous in form and provides a way along which the cooking liquid travels. The channel 18 has side walls 21 and a bottom 19 which are co-extensive with the length of the same. The kettle 12 has one corner of the same removed as designated at 22 leaving a main portion 23 of the width of the base 10 and of less length than the same. This construction provides an extension 24 which extends up to the end of the base 10.

Figure 3:
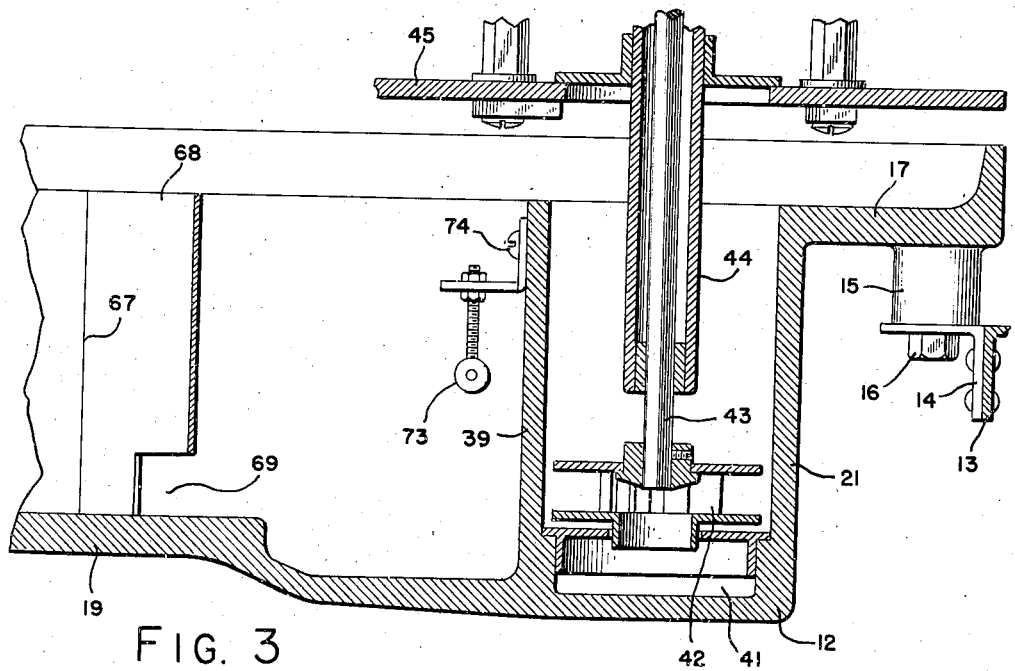
Fig. 3 is a cross sectional view similar to Fig. 2 and taken on line 3—3 of Fig. 1.

The way 18 of the kettle 12 is arranged to provide a straight run 25 which commences in close proximity to the end of the extension 24 and which extends parallel with the kettle substantially throughout the length of the same. Said way at the end of the run 25 makes a curve 26 which leads into a transverse run 27 disposed parallel to the opposite end of the kettle. This latter run connects with a curve 27 which in turn is connected to a straight run 29 parallel with the run 18 and extending in the opposite direction. The run 29 is connected to a loop 31 which in turn is connected to a transverse run 32 parallel to the run 27. This run is connected to a curve 33 which in turn is connected to a straight run 34 lying alongside the run 25 and parallel to the same. The run 34 discharges through an outlet 30 into a reservoir 35 which contains the excess cooking liquid. From this reservoir a short run 36 is employed which is connected by means of a curve 37 to the run 25. The various runs of the way 18 pitch downwardly in the direction of their extent so that the reservoir 35 is at a lower elevation than the run 36. In between the said reservoir and run is provided a wall 38 which is formed partly by the walls 21 of the kettle proper and by means of another wall 39 best shown in Figs. 1 and 3. This well has an opening 40 which serves as an inlet to the run 25. An opening 41 in this wall brings the reservoir 35 into communication with the well 38. In the bottom 19 of the kettle 12 and disposed in the reservoir 35 is a drain 75 by means of which the cooking liquid in the kettle is conveniently removed therefrom.

In the well 38 is provided an impeller 42 which is attached to a shaft 43 mounted in a tubular housing 44. Housing 44 is supported on a table 45 which covers the extension 17 of the kettle 12. Shaft 43 is driven by an electric motor or by any other suitable means such as now is well known in the art. Impeller 42 raises the liquid from the reservoir 35 and discharges it into the run 36 of way 18 through the inlet 40 whereby circulation of the cooking liquid along the way is procured.

Raw doughnuts are fed into the way 18 at the beginning of the run 25 by means of any suitable doughnut cutter. In Fig. 1 the discharge nozzle of a doughnut machine is indicated in dotted lines at 46. It can readily be comprehended that the doughnut cutter and associated structure may be supported on the table 45 in any suitable manner.

In the run 29 of the way 18 is provided a turner 41 by means of which the doughnuts are inverted. An ejector 48 is disposed in the run 34 and removes the cooked doughnuts from the machine. To time the operation of the machine, two control devices 51 and 52 are employed which allow the doughnuts one at a time to enter the turner 47 and the ejector 48 in time sequence.

The control devices 51 and 52, the doughnut cutter and all of the other parts of the invention are operated by means of a transmission disposed within a case 49 situated in the corner 22 of kettle 12. This transmission and other operating parts of the doughnut machine forming no particular feature of the invention have not been shown in detail in the drawings.

Figure 4:
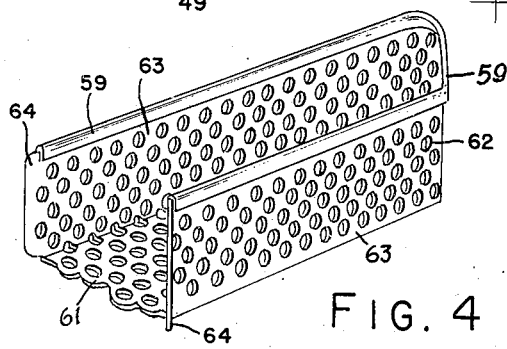
Fig. 4 is a perspective view of the screen of the doughnut machine.
Figure 2:
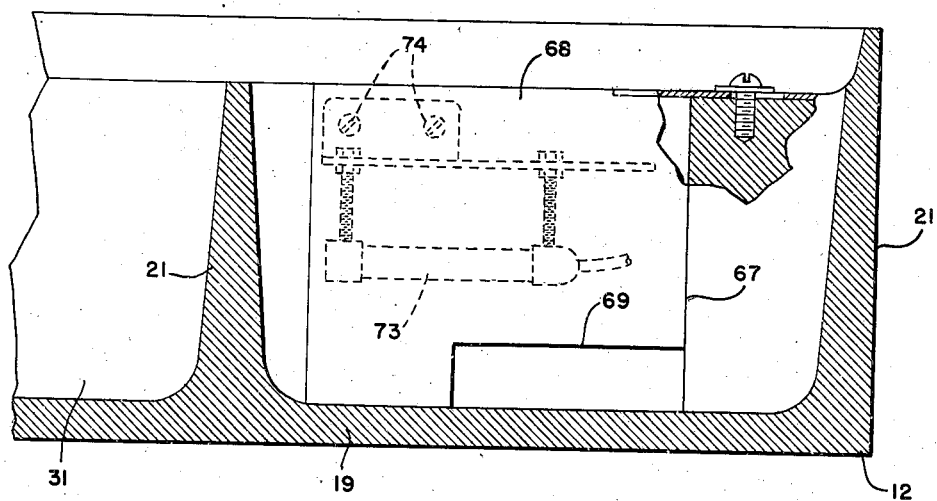
Fig. 2 is a cross sectional view of the doughnut machine taken on line 2—2 of Fig. 1 and drawn to a greater scale.

In the reservoir 35 and in the end of the run 34 of way 18 is disposed a screen 59 best shown in Fig. 4. This screen comprises a bottom 61, and end wall 62, and side walls 63 all of reticulate material. The two side walls 63 have lips 64 which engage the wall 39 of kettle 12 previously referred to and also the wall 21 at the end of the channel 34, of said kettle. All of the cooking liquid passing through the run 34 of the way 18 and through the outlet 30 passes through the said screen and is discharged through the walls thereof and into said reservoir.

In the wall 21 of the loop 31 of way 18 and in the particular portion thereof located adjacently the reservoir 35 is formed an opening 67. For the purpose of simplifying the casting of the kettle this opening is formed throughout the height of the way 18. The said opening is partially closed by means of a closure 68 which is made from a sheet of metal curved to conform in shape to the curvature of the loop 31 at the locality of the same in which the opening 67 is formed. This closure has a slot 69 in the lowermost portion of the same and which forms a by-pass through which a portion of the cooking liquid passing along the run 31 of way 18 may flow directly into the reservoir 35 in a manner to by-pass the screen 59. The closure 68 has a flange 71 formed on the same which overlies the top 17 of the kettle 12. A screw 72 passes through the said flange and is threaded into said top and serves to hold the closure 68 in proper position. It will be readily seen from Fig. 1 that the closure 68 forms a continuation of the wall of the run 31 in which the opening 67 is formed whereby causing the doughnuts to follow along said run in the same manner as if the opening 67 had been omitted.

In conjunction with doughnut machines of the type illustrated it becomes highly desirable to supply additional cooking liquid to the kettle as the cooking liquid is absorbed by the doughnuts. For this purpose the elevation of the cooking liquid in a portion of the cooking kettle is utilized and one of several control devices employed which is sensitive to variation in elevation. One of these devices consists of a thermostat which relies on the difference in temperature between that of the hot cooking liquid and the temperature of the air above the liquid for actuation. One such device is indicated at 73 and Fig. 1 and is attached to the wall 39 by means of screws 74. This device is mounted in the compartment 66 where the elevation of the cooking liquid bears a definite relation to the height of the cooking liquid in the way 18. This device is electrically operated and controls a suitable valve leading from a cooking liquid tank to cause the cooking liquid to enter the way 18 and to bring the height of the cooking liquid in said way up to the proper elevation. If desired a float or other similar device may be similarly employed. Such devices being old in the art have not been shown in detail in the application.

The operation of the invention is as follows:

In normal operation the impeller 42 raises the cooking liquid from the reservoir 35 to the run 36 where the cooking liquid flows by gravity throughout the various runs and returns to the said reservoir through the screen 59. A portion of the cooking liquid, however, by-passes the said screen and passes through the by-pass 69 into the said reservoir. Should the bottom 61 of the screen 59 become covered with crumbs a suitable amount of cooking liquid would not pass through the screen and the elevation of the cooking liquid in the way 34 would rise until enough additional area of the walls 62 and 63 of said screen became available for passage of the cooking liquid into the reservoir. This would increase the height of the cooking liquid in the way 18 and at the same time lower the elevation of said cooking liquid in the reservoir 35. By the use of the by-pass 69 such a situation would not arise since a sufficient amount of cooking liquid would pass through the said by-pass and into the reservoir 35 and by-pass the screen 59. Thus, the elevation of the liquid in the reservoir 35 varies in accordance with the height of the liquid in the way 18 and by the periodic addition of the proper amount of cooking liquid a constant elevation of the same may be maintained in the way 18.

The advantages of the invention are manifest. Applicant's invention eliminates all irregularities in the propulsion of the doughnuts by means of flow of the cooking liquid. With applicant's invention the device for supplying additional cooking liquid can be made to furnish exactly the amount of cooking liquid required. With applicant's invention the height of the cooking liquid in the way can be made to remain substantially constant regardless of the amount of crumbs or foreign matter filling the screen at the outlet of the way. My invention is extremely simple in construction and positive in operation and will not cause trouble.

Changes in the specific form of my invention, as herein described, may be made within the scope of what is claimed without departing from the spirit of my invention.

Having described my invention, what I claim as new and desire to protect by Letters Patent is:

1. In a doughnut machine a kettle having a channel therein containing a cooking liquid and forming a way along which doughnuts may travel, a reservoir in said kettle, an inlet from said reservoir to the beginning of said channel, an outlet from the end of said channel to said reservoir, means for impelling the flow of cooking liquid along said channel, and a passageway between said channel and said reservoir located intermediate said inlet and outlet.

2. In a doughnut machine a kettle having a channel therein containing a cooking liquid and forming a way along which doughnuts may travel, a reservoir in said kettle, an inlet from said reservoir to the beginning of said channel, an outlet from the end of said channel to said reservoir, means for impelling the flow of cooking liquid along said channel, and a passageway between said channel and said reservoir located intermediate said inlet and outlet, said passageway having less volumetric flow than said outlet.

3. In a doughnut machine a kettle having a channel therein containing a cooking liquid and forming a way along which doughnuts may travel, a reservoir in said kettle, an inlet from said reservoir to the beginning of said channel, an outlet from the end of said channel to said reservoir, means for impelling the flow of cooking liquid along said channel, a screen between said outlet and reservoir and a passageway between said channel and reservoir and by-passing said screen.

4. In a doughnut machine a kettle having a channel therein containing a cooking liquid and forming a way along which doughnuts may travel, a reservoir in said kettle, an inlet from said reservoir to the beginning of said channel, an outlet from the end of said channel to said reservoir, means for impelling the flow of cooking liquid along said channel, said channel having a run intermediate the inlet and outlet and disposed adjacent said reservoir and a passageway between said run and said reservoir.

5. In a doughnut machine a kettle having a channel therein containing a cooking liquid and forming a way along which doughnuts may travel, a reservoir in said kettle, an inlet from said reservoir to the beginning of said channel, an outlet from the end of said channel to said reservoir, means for impelling the flow of cooking liquid along said channel, said channel having a run intermediate the inlet and outlet adjacent said reservoir and separated therefrom by a wall, and a passageway through said wall bringing said run into communication with said reservoir.

6. In a doughnut machine a kettle having a channel therein containing a cooking liquid and forming a way along which doughnuts may travel, a reservoir in said kettle, an inlet from said reservoir to the beginning of said channel, an outlet from the end of said channel to said reservoir, means for impelling the flow of cooking liquid along said channel, said channel having a curved run with the outermost wall thereof adjacent said reservoir and a passageway through said wall and bringing said run into communication with said reservoir.

7. In a doughnut machine a kettle having a channel therein containing a cooking liquid and forming a way along which doughnuts may travel, a reservoir in said kettle, an inlet from said reservoir to the beginning of said channel, an outlet from the end of said channel to said reservoir, means for impelling the flow of cooking liquid along said channel, said channel having a run intermediate the inlet and outlet adjacent said reservoir and separated therefrom by a wall, a passageway through said wall bringing said run into communication with said reservoir, said wall having an opening therein, a closure for said opening forming a continuation of said wall and a passageway in said closure bringing said run into communication with said reservoir.

8. In a doughnut machine a kettle having a channel therein containing a cooking liquid and forming a way along which doughnuts may travel, a reservoir in said kettle, an inlet from said reservoir to the beginning of said channel, an outlet from the end of said channel to said reservoir, means for impelling the flow of cooking liquid along said channel, said channel having a loop intermediate the inlet and outlet and disposed adjacent said reservoir and a passageway between said loop and said reservoir.

PETER J. TOEWS.

REFERENCES CITED

The following references are of record in the file of this patent:

UNITED STATES PATENTS

| Number | Name | Date |
| --- | --- | --- |
| 1,629,355 | Morrow | May 17, 1927 |
| 1,690,104 | Denz et al. | Nov. 6, 1928 |
| 2,208,877 | Caswell et al. | July 23, 1940 |